Figure 1:
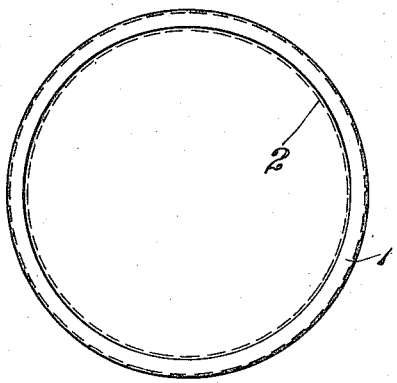

C. E. JOHNSON.
METHOD OF MANUFACTURING PISTON RINGS.
APPLICATION FILED JAN. 10, 1916.

1,214,549.  Patented Feb. 6, 1917.

Inventor
Charles E. Johnson
By Moulton & Livrang
Attorneys.

UNITED STATES PATENT OFFICE.

CHARLES E. JOHNSON, OF MUSKEGON, MICHIGAN, ASSIGNOR TO THE PISTON RING COMPANY, OF MUSKEGON HEIGHTS, MICHIGAN, A CORPORATION OF MICHIGAN.

METHOD OF MANUFACTURING PISTON-RINGS.

1,214,549.     Specification of Letters Patent.     Patented Feb. 6, 1917.

Application filed January 10, 1916. Serial No. 71,328.

*To all whom it may concern:*

Be it known that I, CHARLES E. JOHNSON, a citizen of the United States of America, residing at Muskegon, in the county of Muskegon and State of Michigan, have invented certain new and useful Improvements in Methods of Manufacturing Piston-Rings; and I do hereby declare the following to be a full, clear, and exact description of the invention, such as will enable others skilled in the art to which it appertains to make and use the same.

This invention relates to a method of manufacturing piston rings and the like, and the object and purpose of the invention is the production of a new method for casting and finishing a ring such that when it is finished it will have a perfectly circular outer surface adapted to contact at all points with a cylinder in which it is used.

In the production of a piston ring, as previously made, it has been usual to make a ring greater in diameter than the diameter of the cylinder in which it is to be used after which a portion of the ring at one side is removed and the ends brought together, in this manner compressing the ring and making it of lesser circumference such that it can be inserted in a cylinder. At the same time the resilience of the ring operating against this compression causes it to yieldably engage the inner surface of the cylinder. Rings of this character, however, are not entirely satisfactory as the compression of this ring which has had a circular outline does not result in the production of the ring whose outer surface is a true circle and, accordingly, there results an imperfect fit in the cylinder.

Various means have been used in an attempt to overcome this difficulty, none of which are entirely successful and it is the primary object and purpose of my method to produce a ring which when finished and the ends at the parting of the ring brought together, will have its outer surface a true circle and yet the ring have a resiliency such that its normal tendency is to separate at the parting, this causing the ring to yieldably engage against the sides of a cylinder in which it is operable.

In the drawings I have illustrated as much as possible the method which I propose to follow in producing piston rings of this character.

Figure 4:
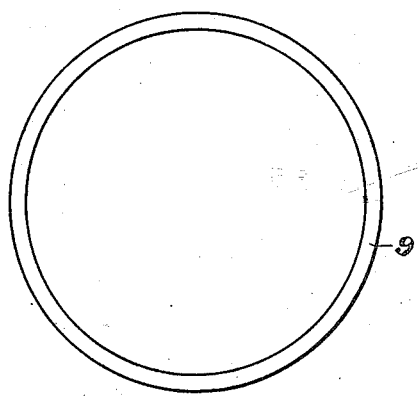
Figure 2:
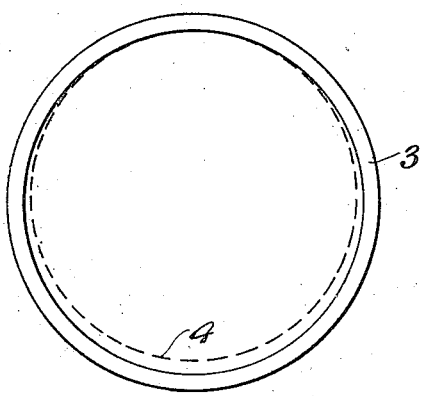
Figure 5:
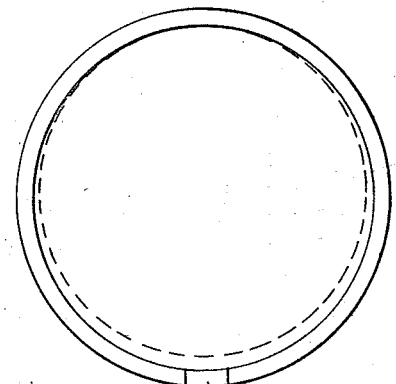
Figure 3:
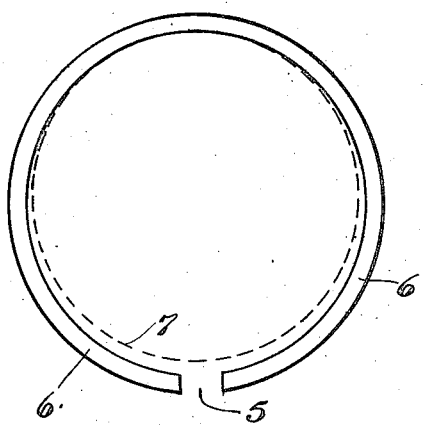
Figure 6:
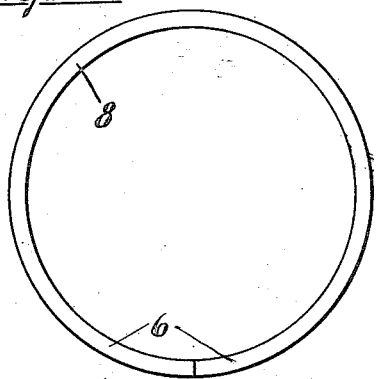

In the drawings; Figure 1 is a plan view of a circular pattern from which, after distortion, the ring castings are made, the outlines of the pattern being shown in full lines and the outline of the ring designed to be made from the pattern being shown in dotted lines. Fig. 2 is a plan of said pattern after it has been compressed and distorted out of a true circle. Fig. 3 is a plan view of a casting produced from the pattern shown in Fig. 2 and having a section removed from one side thereof. Fig. 4 is a plan view of a pattern which is formed in the beginning to have a shape identical with that shown in full lines in Fig. 2. Fig. 5 is a plan view of the casting produced from the pattern shown in Fig. 4 and indicating the section which is to be removed from one side; while Fig. 6 is a plan view of the finished ring with the section removed and with its ends brought together to close the opening after the removal of said section.

Like numbers refer to like parts in the several views of the drawing.

One way in which the pattern from which the rings are to be produced is made is to provide a perfectly circular pattern as indicated at 1 which is slightly larger in diameter than the finished ring, the outline of the finished ring being indicated at 2 in dotted lines. This pattern is of a thickness equal to the thickness of a finished ring plus what is needed for shrinkage and finishing of the ring. When the pattern 1 in this perfectly circular form has been produced it is then placed in a form and distorted by force so as to take the formation shown at 3 in Fig. 2, this showing one side of the pattern at its inner surface shaped to coincide with the dotted line 4 which is a true circle of a diameter equal to the inner diameter of the completed ring and identical with the inner dotted line of Fig. 1 in diameter while the opposite side of the pattern is spaced a distance from this line, there being a gradual and progressive increase of the distance of the inside of the pattern from this line 4 and correspondingly a progressive increase in the radius of curvature in both directions from the point where it coincides to the point directly opposite. The pattern 3 accordingly is distorted out of a true circular form and this is a preferred way of producing the pattern though it is to be understood that the pattern may be fashioned directly in the first place by means of templets and the like or by any other means so that the pattern when first produced as shown at 9 in Fig. 4 will be of an outline identical with the pattern 3 shown at Fig. 2 and correspondingly out of true circular form. The casting which is produced from either pattern shown in Figs. 2 and 4 is indicated in Figs. 3 or 5 and a section is cut from the pattern at the point where the arc of curvature is of the greatest radius as shown at 5 in Fig. 3, leaving two ends 6 separated a distance from each other which, when they are brought together as shown in Fig. 6, will cause the inner surface of the casting to coincide with the dotted line 7 which is a true circle indicating the inner surface of the finished piston ring as it should appear when it is placed on the piston for operation in a cylinder while the outer surface of the ring has a diameter substantially equal to the inside diameter of the cylinder in which it is to be used. The diameter of the dotted line circle shown at 2, 4 and 7 in Figs. 1, 2 and 3 respectively, is the inner diameter of the finished ring when its ends are brought together ready for insertion in a cylinder, and it will be apparent that as the pattern and ring made therefrom are of uniform thickness the outside surfaces of said pattern or ring have radii of curvature concentric with the radii of curvature of the inside surfaces of the pattern or ring respectively.

The section which is to be removed from a casting after the casting has been produced from either of the patterns 3 or 9 is indicated at 10 in Fig. 5 and this may be cut or machined out in any manner desired. After the casting has had the section removed the ends 6 are brought together and the casting finished to produce the finished ring, the outer diameter of which is the same as the outer dotted line shown in Fig. 1, the complete ring being indicated at 8 and in the position that it occupies when in use in a cylinder.

It will be obvious from the foregoing that with a pattern thus formed a ring may be produced which is perfectly circular in outline when the ends at the parting are brought together and which will fit truly in a cylinder of the same inner diameter, and pressure against the sides of a cylinder may be produced and as the finished ring is of perfectly circular outline it will touch evenly at all points against the inner surface of the cylinder.

I claim:—

The method of making piston rings and the like which consists in producing an integral pattern of curved outline, at one side having an outside radius of curvature substantially the same as the radius of curvature of the cylinder in which the ring is to operate, said radius for the pattern progressively increasing in length from said side to the diametrically opposed side thereof, then casting from said pattern, then removing a section from the side of the casting having the greatest radius of curvature sufficient that when the ends at the parting produced by said removal of the section are brought together a perfect and circular ring is produced, then compressing the casting to close the opening left on removal of the segment and then finishing the casting to working size while in compressed condition.

In testimony whereof I affix my signature.

CHARLES E. JOHNSON.